US011922913B2

United States Patent

Kurio et al.

(10) Patent No.: US 11,922,913 B2
(45) Date of Patent: Mar. 5, 2024

(54) INFORMATION PROCESSING DEVICE, INFORMATION PROCESSING METHOD, AND NON-TRANSITORY COMPUTER READABLE RECORDING MEDIUM

(71) Applicant: Roland Corporation, Shizuoka (JP)

(72) Inventors: Hiroya Kurio, Shizuoka (JP); Masato Ueno, Shizuoka (JP); Shinji Asakawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 17/920,015

(22) PCT Filed: Sep. 4, 2020

(86) PCT No.: PCT/JP2020/033637
§ 371 (c)(1),
(2) Date: Oct. 19, 2022

(87) PCT Pub. No.: WO2022/049732
PCT Pub. Date: Mar. 10, 2022

(65) Prior Publication Data

US 2023/0144216 A1 May 11, 2023

(51) Int. Cl.
*G10H 1/36* (2006.01)
*G10H 1/00* (2006.01)
*G10H 1/14* (2006.01)

(52) U.S. Cl.
CPC ........... *G10H 1/368* (2013.01); *G10H 1/0008* (2013.01); *G10H 1/0066* (2013.01); *G10H 1/14* (2013.01);

(Continued)

(58) Field of Classification Search
CPC ........... G10H 1/0008; G10H 2210/066; G10H 1/0066; G10H 2240/056; G10H 1/0058;

(Continued)

(56) References Cited

U.S. PATENT DOCUMENTS 5,092,216 A * 3/1992 Wadhams ............ G10H 1/0008 84/602
5,827,990 A 10/1998 Fujita (Continued)

FOREIGN PATENT DOCUMENTS

CN 1622191 A * 6/2005
CN 101326569 12/2008

(Continued)

OTHER PUBLICATIONS

"International Search Report (Form PCT/ISA/210) of PCT/JP2020/033637," dated Oct. 27, 2020, with English translation thereof, pp. 1-4.

(Continued)

*Primary Examiner* — Marlon T Fletcher
(74) *Attorney, Agent, or Firm* — JCIPRNET

(57) ABSTRACT

An information processing device includes a control part which receives an input of information indicating one or more times in a playback time of a musical piece, and generates a file including information pertaining to a timbre control performed from each of the one or more times; and a transmission part which transmits an audio signal of the musical piece and the information pertaining to the timbre control in the file to a device which outputs a synthetic sound of a playback sound of the musical piece and a playing sound of a musical instrument.

20 Claims, 15 Drawing Sheets

(52) U.S. Cl.
CPC . *G10H 2210/005* (2013.01); *G10H 2220/116* (2013.01); *G10H 2240/311* (2013.01); *G10H 2240/321* (2013.01)

(58) Field of Classification Search
CPC .... G10H 2240/251; G10H 1/368; G10H 7/00; G10H 2240/131; G10H 2240/085; G10H 2240/311; G10H 1/0033; G10H 2240/145; G10H 2240/061; G10H 1/365; G10H 1/361; G10H 2240/325; G10H 1/0091; G10H 2210/155; G10H 2210/081; G10H 2220/015; G10H 2240/241; G10H 2210/105; G10H 1/02; G10H 1/36; G10H 2240/031; G10H 1/18; G10H 2240/135; G10H 2240/125; G10H 1/0083; G10H 2250/315; G10H 2240/016; G10H 2240/321; G10H 2240/121; G10H 2220/155; G10H 2240/161
See application file for complete search history.

(56) References Cited

U.S. PATENT DOCUMENTS

| | | | | |
|---|---|---|---|---|
| 6,184,454 | B1 | 2/2001 | Imai et al. | |
| 10,062,367 | B1 | 8/2018 | Evans et al. | |
| 2006/0210956 | A1 * | 9/2006 | Okamoto | G10H 7/02 434/307 A |
| 2018/0090114 | A1 | 3/2018 | Lee | |
| 2018/0374462 | A1 | 12/2018 | Steinwedel et al. | |

FOREIGN PATENT DOCUMENTS

| | | | | | |
|---|---|---|---|---|---|
| CN | 102654998 | | | 9/2012 | |
| CN | 102800307 | | | 11/2012 | |
| CN | 105190741 | | | 12/2015 | |
| CN | 107210055 | | | 9/2017 | |
| CN | 108766408 | | | 11/2018 | |
| CN | 109192218 | | | 1/2019 | |
| CN | 110419076 | A | * | 11/2019 | G10H 1/00 |
| CN | 114005424 | A | * | 2/2022 | |
| CN | 115461809 | A | * | 12/2022 | |
| DE | 60018626 | T2 | * | 4/2006 | G10H 1/0008 |
| EP | 1172796 | | | 1/2002 | |
| IN | 106251890 | | | 12/2016 | |
| JP | H1173182 | A | * | 1/1999 | |
| JP | 2000029462 | A | * | 1/2000 | G10H 1/0066 |
| JP | 3178463 | B2 | * | 6/2001 | G10H 1/0066 |
| JP | 2005510763 | | | 4/2005 | |
| JP | 2006091804 | | | 4/2006 | |
| JP | 2006154777 | | | 6/2006 | |
| JP | 2006284817 | A | * | 10/2006 | G10H 1/0008 |
| JP | 2007121876 | | | 5/2007 | |
| JP | 2008191546 | | | 8/2008 | |
| JP | 2008191546 | A | * | 8/2008 | |
| JP | 2014071214 | A | * | 4/2014 | |
| JP | 2014071215 | A | * | 4/2014 | |
| JP | 2014071226 | A | * | 4/2014 | |
| WO | WO-03046734 | A1 | * | 6/2003 | G06Q 20/00 |
| WO | WO-2012064847 | A1 | * | 5/2012 | G06F 3/041 |
| WO | WO-2017165825 | A1 | * | 9/2017 | G06F 16/4387 |
| WO | WO-2022049732 | A1 | * | 3/2022 | |

OTHER PUBLICATIONS

"Written Opinion of the International Searching Authority (Form PCT/ISA/237) of PCT/ JP2020/033637," dated Oct. 27, 2020, with English translation thereof, pp. 1-6.
"Search Report of Europe Counterpart Application", dated May 8, 2023, p. 1-p. 8.
"Office Action of China Counterpart Application", dated Jun. 3, 2023, with English translation thereof, p. 1-p. 16.
"Office Action of China Counterpart Application", dated Dec. 12, 2023, with English translation thereof, p. 1-p. 8.

* cited by examiner

Session file

・Musical piece name: Song Rock 1

・Save location (URL)

・Marker (MARKER) (1)
- Time (Time) 00:00:00
- Marker name (MARKER NAME): Intro
- Memory number: 01

・Marker (2)
- Time 00:10:00
- Marker name: Backing Chord
- Memory number: 02

・Marker (3)
- Time 00:33:00
- Marker name: Solo Crunch
- Memory number: 08

FIG. 4

INFORMATION PROCESSING DEVICE, INFORMATION PROCESSING METHOD, AND NON-TRANSITORY COMPUTER READABLE RECORDING MEDIUM

CROSS-REFERENCE TO RELATED APPLICATION

This application is a 371 application of the International PCT application serial no. PCT/JP2020/033637, filed on Sep. 4, 2020. The entirety of the above-mentioned patent application is hereby incorporated by reference herein and made a part of this specification.

TECHNICAL FIELD

The disclosure relates to an information processing device and an information processing method.

RELATED ART

Conventionally, there is a system making it possible to deliver a multimedia presentation of an audio file to a computing device for display to a user, and further allow the user to play a musical instrument in accordance with the multimedia presentation (see, for example, Patent Document 1). There is also a music player in which an XML file describing control information about processing to be executed by an effector and information on an execution time thereof is downloaded from a link of the content selected from a content type list, and an effector processing specified by the effector is executed when a playback position of music data reaches the execution time (see, for example, Patent Document 2).

PRIOR-ART DOCUMENTS

Patent Documents

Patent Document 1: Japanese Translation of PCT International Application Publication No. 2005-510763

Patent Document 2: Japanese Patent Laid-open No. 2008-191546

SUMMARY OF THE INVENTION

Problems to be Solved by the Invention

An object of the disclosure is to provide an information processing device and an information processing method in which information for performing playback with a desired timbre from a desired time in a playback time of a musical piece can be set.

Means for Solving the Problems

One aspect of the disclosure provides an information processing device including: a control part, receiving an input of information indicating one or more times in a playback time of a musical piece, and generating a file including information pertaining to a timbre control performed from each of the one or more times; and a transmission part, transmitting an audio signal of the musical piece and the information pertaining to the timbre control in the file to a device that outputs a synthetic sound of a playback sound of the musical piece and a playing sound of a musical instrument.

One aspect of the disclosure may include an information processing method, a program, a recording medium storing a program, an information processing system including an information processing device and a device (timbre control device), or the like, each of which has the same features as the information processing device.

BRIEF DESCRIPTION OF THE DRAWINGS

FIG. 4 shows a data structure example of a session file.

DESCRIPTION OF THE EMBODIMENTS

An embodiment describes an information processing device including:

(1) a control part, receiving an input of information indicating one or more times in a playback time of a musical piece, and generating a file including information pertaining to a timbre control performed from each of the one or more times; and (2) a transmission part, transmitting an audio signal of the musical piece and the information pertaining to the timbre control in the file to a device that outputs a synthetic sound of a playback sound of the musical piece and a playing sound of a musical instrument.

According to the information processing device, the input of one or more times in the playback time of the musical piece and the information pertaining to the timbre control corresponding to each time are received. Hence, a user of the information processing device is able to set their desired timbre control with respect to each of their desired time. The audio signal of the musical piece and the information pertaining to the timbre control are transmitted to the device that outputs the synthetic sound of the playback sound of the musical piece and the playing sound of the musical instrument. Accordingly, in the device, audio control can be performed on at least one of the playback sound of the musical piece and the playing sound of the musical instrument. The "audio control" includes changing a waveform of a sound wave by processing an audio signal, and includes imparting an effect to an audio signal and processing an audio signal of a playing sound of an electric guitar into a simulated sound obtained at the time of connecting to a predetermined guitar amplifier. The timbre control and the effect include vibrato, tremolo, reverb, chorus, delay, overdrive/distortion, and the like.

Embodiment

Hereinafter, an information processing device and an information processing method as well as a program according to an embodiment will be described with reference to the drawings. The configuration of the embodiment is exemplary, and the disclosure is not limited to the configuration of the embodiment.

<Information Processing System>

Figure 1:
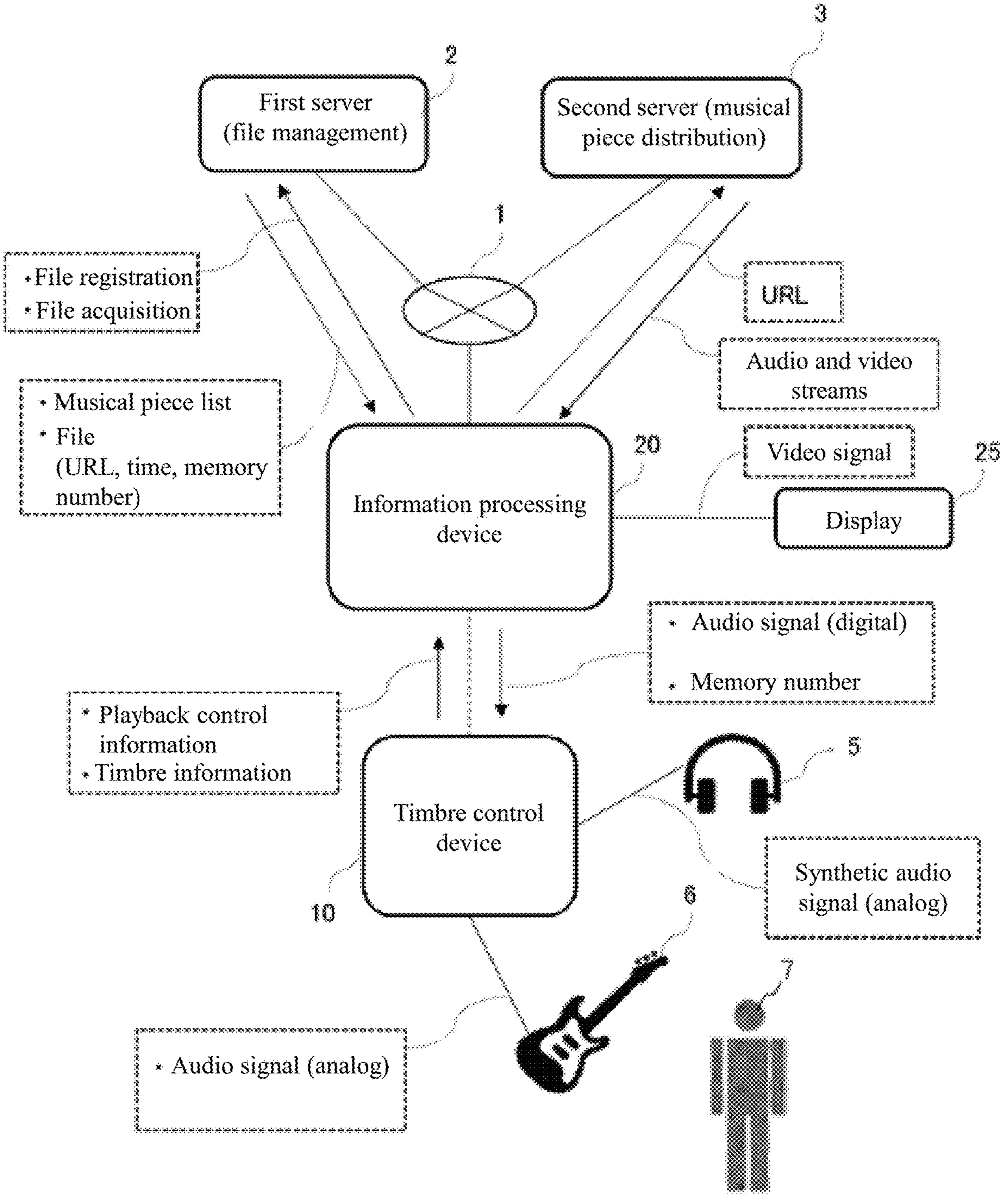
FIG. 1 shows a configuration example of an information processing system.

FIG. 1 shows a configuration example of an information processing system including an information processing device. The information processing system is used by a user of the information processing system in order to practice playing a musical instrument to the accompaniment of a playback sound of a musical piece.

The information processing system includes an information processing device 20, a timbre control device 10 able to communicate with the information processing device 20, and a first server 2 and a second server 3 connected to the information processing device 20 via a network 1. The timbre control device 10 is an example of a device that outputs a synthetic sound of a playback sound of a musical piece and a playing sound of a musical instrument.

The network 1 is a public network (WAN) such as the Internet, a long term evolution (LTE) network, or 5G, or an intranet or the like. The network 1 may include a wireless section. The first server 2 is able to manage information about a musical piece for a musical instrument practice and supply the information to the information processing device 20.

The second server 3 is able to manage data of the musical piece for practice provided for a user 7 and supply the data to the information processing device 20. The information processing device 20 transmits to the timbre control device 10 an audio signal based on the data of the musical piece and information pertaining to a timbre control to be performed from a desired timing (time) in a playback time of the musical piece.

An electric guitar 6 as an example of the musical instrument and a headphone 5 are connected to the timbre control device 10. The headphone 5 is worn by the user 7, and the electric guitar 6 is played by the user 7. The musical instrument may be a musical instrument (such as a stringed instrument such as a bass, a keyboard instrument such as a piano, a percussion instrument such as a drum, and a wind instrument such as a saxophone) other than the electric guitar 6. The musical instrument may be an electronic musical instrument or an acoustic musical instrument if it is configured so that an electrical signal corresponding to a playing sound produced by playing the musical instrument is input to the timbre control device 10.

The timbre control device 10 is a device able to output to the headphone 5 a synthetic sound obtained by synthesizing the playback sound of the musical piece and the playing sound of the musical instrument (electric guitar 6). By hearing the audio from the headphone 5, the user 7 is able to practice a session between the electric guitar 6 played by the user themselves and the playback sound (playing sound of another musical instrument) of the musical piece.

Upon output of the synthetic sound, the timbre control device 10 receives an audio signal of the musical piece and information pertaining to a timbre control corresponding to each time transmitted from the information processing device 20, and, based on the information pertaining to the timbre control, the timbre control device 10 performs the timbre control (that is, processing with respect to the audio signal) on at least one of the playback sound of the musical piece and the playing sound of the musical instrument.

The information processing device 20 is an information terminal having a communication function, and is a dedicated or general-purpose computer (computing device) including a personal computer, a smart phone, a tablet terminal or the like. The information processing device 20 may be a fixed terminal or a mobile terminal. In the present embodiment, it is assumed that the information processing device 20 is a smart phone.

An application program (hereinafter referred to as "practice app") for a musical instrument practice using the information processing system is installed on the information processing device 20. By execution of the practice app, the information processing device 20 generates information to be included in a file called a session file by the user 7, and provides the user 7 with an environment in which the session file is registered with the first server 2.

The information processing device 20 receives a list of musical pieces for practice from the first server 2. The list includes a Uniform Resource Locator (URL) being information indicating a save location of a file (musical piece file) of each musical piece. According to a result of selection of a musical piece of the user 7, the information processing device 20 accesses the second server 3 using a URL of the selected musical piece, and acquires musical piece data stored on the second server 3.

The second server 3 is a server providing a video supply service or a video distribution service, such as YouTube™. There are no limitations on file format of the musical piece data. In the present embodiment, the musical piece data is provided in the form of a video file with audio. Examples of the file format of the video file with audio include ".MOV", "MPEG4", ".MP4", ".AVI", and ".WMV". However, the file format is not limited to the above examples. It is not essential that a musical piece data file be a video file with audio, and a musical piece file may be an audio file.

A video stream and an audio stream are input from the second server 3 to the information processing device 20 as video data and musical piece data based on the video file with audio. The information processing device 20 sends a video signal based on the video stream to a display 25 (an example of a "display device"), and an image (video) based on the video stream can be displayed on the display 25. Meanwhile, the information processing device 20 transmits an audio signal based on the audio stream to the timbre control device 10.

The above example has described streaming playback of a video file with audio. However, download playback may be performed. A configuration may be adopted in which the musical piece data file is stored in advance in a storage device accessible by the information processing device 20 and the musical piece data is acquired therefrom, and the second server 3 may be omitted. In this case, a memory address or the like, instead of a URL, is used as the information indicating the save location of the musical piece data.

Playback control such as playback, pause, rewind, and fast forward of a musical piece (video with audio) can be performed by the user 7 by operating a user interface (UI) provided by the information processing device 20.

In the case where the user 7 operates an operator (such as a button, a switch, or a knob) included in the timbre control device 10, the information processing device 20 is also able to receive, from the timbre control device 10, playback control information transmitted to the information processing device 20 from the timbre control device 10, and control playback of the musical piece.

Figure 2:
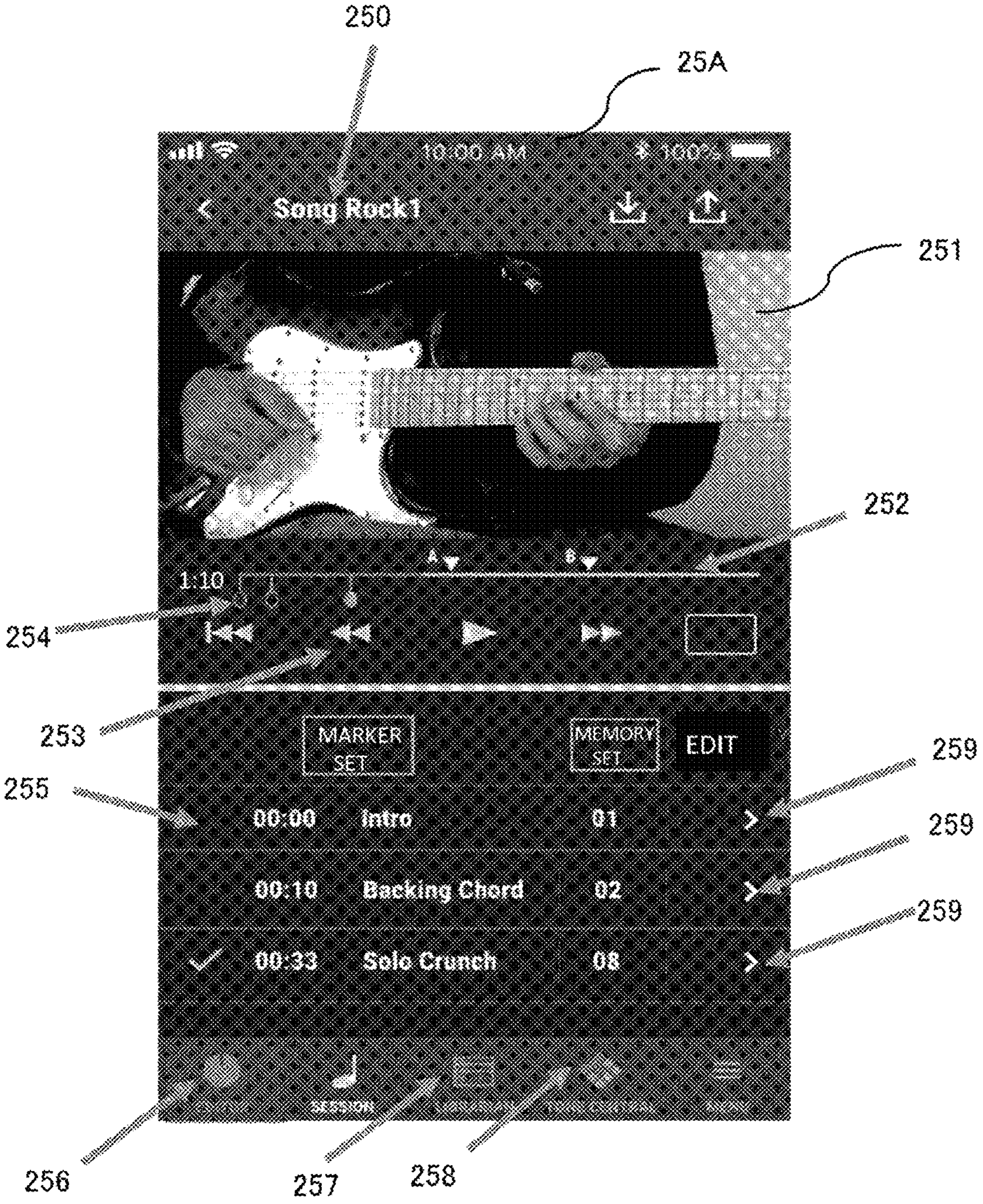
FIG. 2 shows a screen display example of a playback screen of a video with audio.
Figure 3:
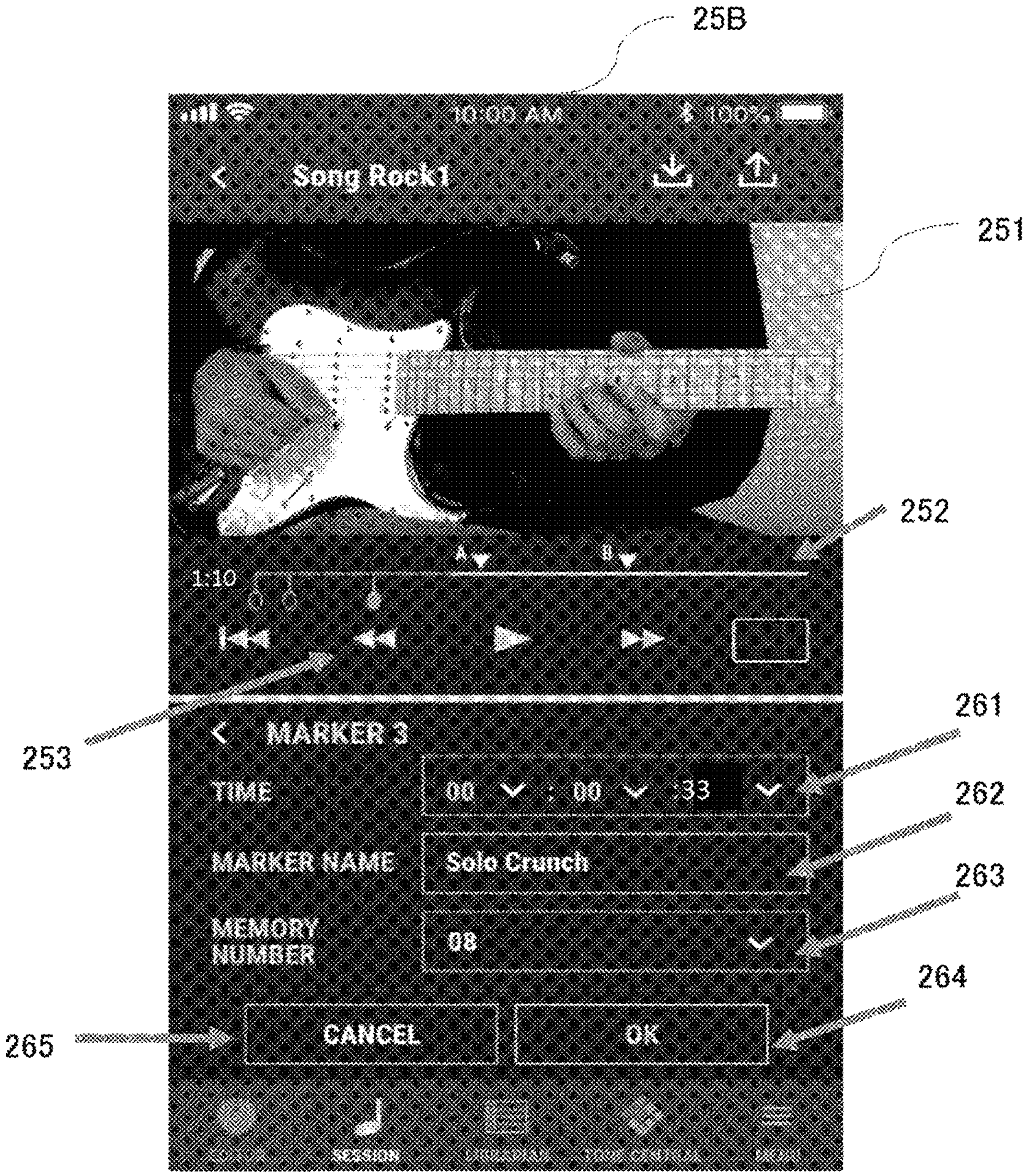
FIG. 3 shows a screen display example of a marker editing screen.

Various screens including a playback screen 25A for a video with audio and an editing screen 25B for a marker are displayed on the display 25. FIG. 2 shows a screen display example of the playback screen 25A for a video with audio, and FIG. 3 shows a screen display example of the editing screen 25B for a marker. The playback screen 25A and the editing screen 25B are displayed by execution of the practice app. However, the playback screen 25A and the editing screen 25B may be provided by a web browser installed on the information processing device 20.

A name ("Song Rock1" in FIG. 2) 250 of a musical piece selected from a musical piece list is displayed in an upper section of the playback screen 25A, and a display area 251 for a video is provided therebelow. In the display area 251 for a video, an initial screen of the video with audio acquired from the second server 3 using the URL of the musical piece is displayed, and playback is started by inputting a playback instruction. As the video to be played back, for example, an image for a lesson showing how to press strings of an electric guitar may be displayed. However, there are no limitations on the content of the video, and the video may be a still image. In the case where the musical piece file is an audio file, nothing, or an image prepared in advance, is displayed in the display area 251.

Below the display area 251 for a video, a seek bar 252 indicating a playback time of the video with audio (musical piece) is displayed; on the left side (periphery) of the seek bar 252, a current time (playback time) in the playback time is displayed.

Below the seek bar 252, a UI 253 for performing playback, pause, rewind, and fast forward operations (playback control) on the video with audio is displayed. The UI 253 shown in FIG. 2 includes, in order from the right, symbols indicating fast forward, playback, rewind, and rewind to the beginning of a song, and each symbol functions as a button for a corresponding operation. In a state in which the initial screen of the video with audio is displayed in the display area 251, when the symbol (playback button) indicating playback is pressed, playback of the video with audio is started. At this time, the symbol indicating playback switches to the symbol indicating pause, and when the symbol indicating pause is pressed, the playback of the video with audio is paused. At this time, the symbol indicating pause switches again to the symbol indicating playback. In this way, the playback button and the pause button are alternately displayed.

Below the UI 253 is displayed a marker list 255 set with respect to a musical piece. A marker indicates a starting point of a timbre control of the musical piece. In the example shown in FIG. 2, three markers are set with respect to the musical piece, and a record for each marker is shown.

The first marker is a marker whose name is "Intro", in which a time "00:00" in the playback time of the video with audio and a memory number are set. The memory number is information specifying a set of parameters (timbre parameters) for processing an audio signal into a predetermined (desired by the user 7) timbre, and is an example of "information pertaining to a timbre control". The information on the set of timbre parameters is stored in a storage area of a memory (storage device 102) included in the timbre control device 10. The memory number indicates a storage location (address) of data of the set of timbre parameters and acts as an identifier for the set of timbre parameters. For example, a memory number "01" corresponding to the time "00:00" indicates a set of timbre parameters applied to a timbre control from the time "00:00". A set of timbre parameters is sometimes also called a "patch".

The second marker is a marker whose name is "Backing Chord". In the second marker, a time "00:10" in the playback time of the video with audio and a memory number "02" corresponding to the time "00:10" are set.

The third marker is a marker whose name is "Solo Crunch". In the third marker, a time "00:33" in the playback time of the video with audio and a memory number "08" corresponding to the time "00:33" are set.

In the marker list 255, each marker record is displayed in the order of time, name, and memory number, and a symbol 259 indicating switching to the editing screen 25B (FIG. 3) is shown at the right end. When the symbol 259 is pressed, the editing screen 25B for editing the corresponding marker is displayed on the display 25.

In FIG. 3, like the playback screen 25A, an upper section of the editing screen 25B for a marker is a screen for viewing and performing playback control of the video with audio (musical piece). In a lower section of the editing screen 25B, a screen for editing a record of a marker selected from the marker list 255 on the playback screen 25A is displayed. That is, an input field 261 of a time (TIME), an input field 262 of a marker name (MARKER NAME), an input field 263 of a memory number (MEMORY NUMBER), a confirmation button ("OK" button) 264 and a CANCEL button 265 of an input item are displayed.

When the OK button is pressed, the display may be switched to the playback screen such that the confirmed content of the time, marker name, and memory number set using the input fields 261 to 263 is displayed on the marker list 255.

A symbol 254 of a marker is displayed in the seek bar 252. The symbol 254 of a marker indicates a relative position of a time in the playback time of the musical piece indicated by the seek bar 252. In the symbol 254 of a marker, the symbol 254 of a marker that corresponds to a memory number whose use has ended (switched to another) due to passage of the playback time is displayed in a different mode from the symbol 254 of a marker that corresponds to a memory number currently in use. In the example shown in FIG. 2, the symbol 254 corresponding to the memory number whose use has ended is indicated by an unfilled ellipse, and the symbol 254 corresponding to the memory number in use is indicated by a filled ellipse.

On the playback screen 25A, an editing button 256 for a memory number is provided below the marker list 255. When the editing button 256 is pressed, a memory number editing screen (an example of a "timbre control content editing screen") is displayed on the display 25. By using the editing screen, the user 7 is able to edit a memory number (set of timbre parameters) corresponding to (assigned to) a time. At this time, the user 7 is able to edit the memory number by using one of a UI displayed on the editing screen and the operator provided in the timbre control device 10. That is, the information processing device 20 is able to display the timbre control content editing screen on the display 25, and receive information indicating content of the timbre control transmitted to the information processing device 20 from the timbre control device 10. The information processing device 20 and the timbre control device 10 communicate with each other, and an operation state of a UI in the information processing device 20 and an operation state of the operator of the timbre control device 10 are synchronized with each other.

When a button 257 below the marker list 255 is pressed, a memory number list created in advance is displayed, and the user 7 is also able to confirm the memory number assigned to the time from the memory number list.

Through setting of one or more markers with respect to the musical piece, the information processing device 20 generates a file (called a session file) including a marker setting result. FIG. 4 shows a data structure example of a session file. The session file is generated for each musical piece, that is, for each video file with audio that includes a musical piece. The session file includes a name of a musical piece or musical piece file, a URL being the information indicating the save location of the musical piece file, and information indicating the one or more markers set with respect to the musical piece.

As the marker information, the marker name, information indicating a time (arbitrarily set by the user 7) in the playback time of the musical piece, and information (that is, a memory number) indicating a set of timbre parameters being information indicating a timbre control applied from that time are stored. The example shown in FIG. 4 illustrates a case where three markers are set with respect to one musical piece. In the present embodiment, one URL is set with respect to one musical piece, and the musical piece file is uniquely determined by the URL.

Through execution of the practice app, the information processing device 20 provides an environment for practicing the electric guitar 6 to the accompaniment of the playback sound of the musical piece using the information included in the session file registered by the user 7 with the first server 2, the musical piece data provided from the second server 3, and the timbre control device 10.

For example, in a state in which the playback screen 25A is displayed on which setting of a marker has ended and playback of the video file with audio is being waited for, when the user 7 presses a playback button provided in the timbre control device 10, a playback instruction for the video file with audio is transmitted to the information processing device 20. When receiving the playback instruction, the information processing device 20 starts playback of the video file with audio, and performs processing for displaying a playback image in the display area 251 of the playback screen 25A and processing for transmitting an audio signal based on the musical piece data to the timbre control device 10.

Before a time in each of the one or more markers set with respect to the musical piece arrives, the information processing device 20 transmits information (set of timbre parameters) on a memory number corresponding to the time to the timbre control device 10 in accordance with the transmission of the audio signal. The timbre control device 10 has a memory storing the memory number information, and the information on the set of timbre parameters is stored in a storage area indicated by the memory number set in the session file.

When a time set in a marker arrives, the timbre control device 10 performs audio control (that is, audio signal processing) using a set of timbre parameters of a memory number corresponding to that time. For example, the timbre control device 10 processes a playing sound of the electric guitar 6, and connects a musical sound signal obtained by synthesizing (mixing) the processed playing sound of the electric guitar 6 and the playback sound of the musical piece to the headphone 5. Accordingly, the user 7 is able to hear the playing sound of the electric guitar 6 whose timbre has been changed at a desired timing. The audio signal processing based on the set of timbre parameters of the memory number may be performed on the playback sound of the musical piece or the synthetic sound of the playing sound of the electric guitar 6 and the playback sound of the musical piece.

<Information Processing Device>

Figure 5:
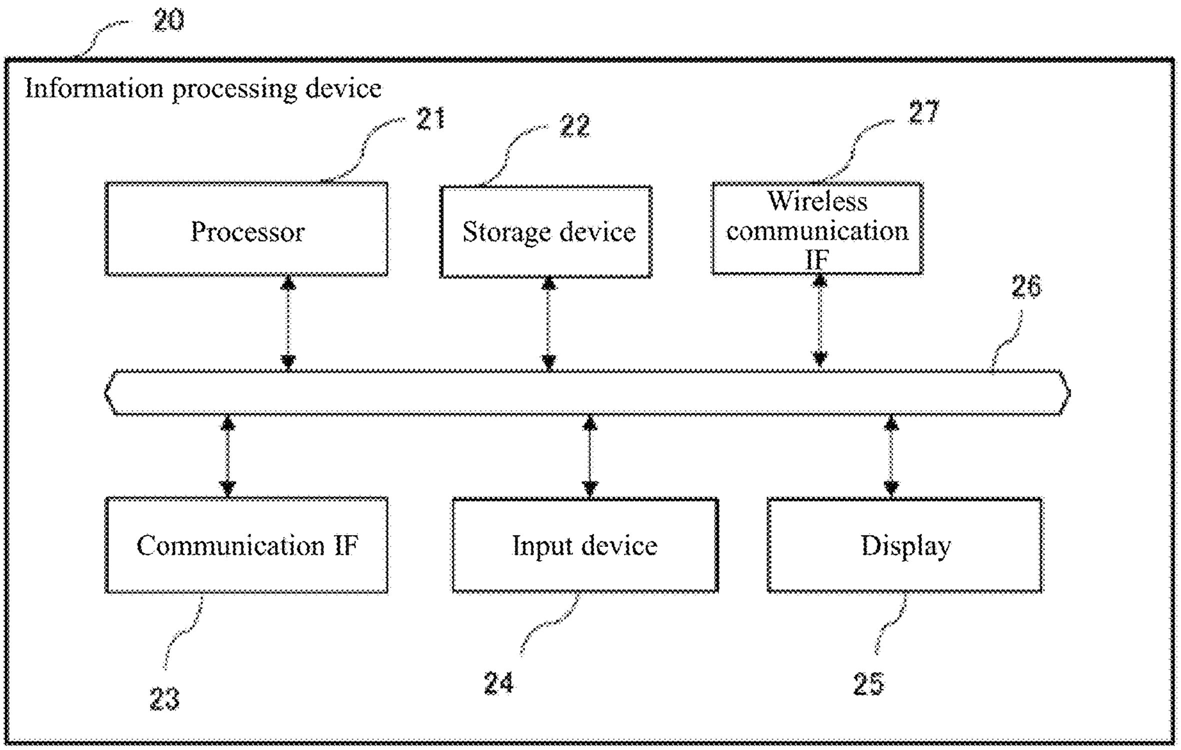
FIG. 5 shows a configuration example of an information processing device.

FIG. 5 shows a configuration example of the information processing device 20. In FIG. 5, the information processing device 20 includes a processor 21, a storage device 22, a communication interface (communication IF) 23, an input device 24, the display 25 and a wireless communication IF 27 that are connected to a bus 26. The processor 21 is an example of a control part (control device, controller). Each of the communication IF 23 and the wireless communication IF 27 is an example of a transmission part (transmission device, transmitter).

The storage device 22 includes a read only memory (ROM), a random access memory (RAM), a hard disk drive (HDD), a solid state drive (SSD), a flash memory, an electrically erasable programmable read only memory (EEPROM) or the like. The storage device 22 is used as a storage area for data and programs, a work area of the processor 21, a buffer area for communication data, or the like.

The communication IF 23 is, for example, a network interface card (NIC), and is used for data transmission and reception via the network 1. The input device 24 includes a key, a button, a pointing device (such as a mouse), a touch panel, a knob, a switch or the like, and is used for information and data input. The display 25 is, for example, an LCD, and is used for information display. The wireless communication IF 27 is a wireless communication circuit in accordance with a predetermined wireless communication standard. In the present embodiment, the wireless communication IF 27 supports Bluetooth and Bluetooth low energy (BLE), and is used for wireless communication with the timbre control device 10. The information processing device 20 is able to transmit and receive data to and from the timbre control device 10 via a universal serial bus (USB).

The processor 21 is, for example, a central processing unit (CPU), and executes various programs including an operating system (OS) and the practice app. By execution of the practice app, the processor 21 performs processing for providing an environment for generating and saving a session file and processing for supplying an audio signal and memory number information to the timbre control device 10 in accordance with the session file.

Figure 6:
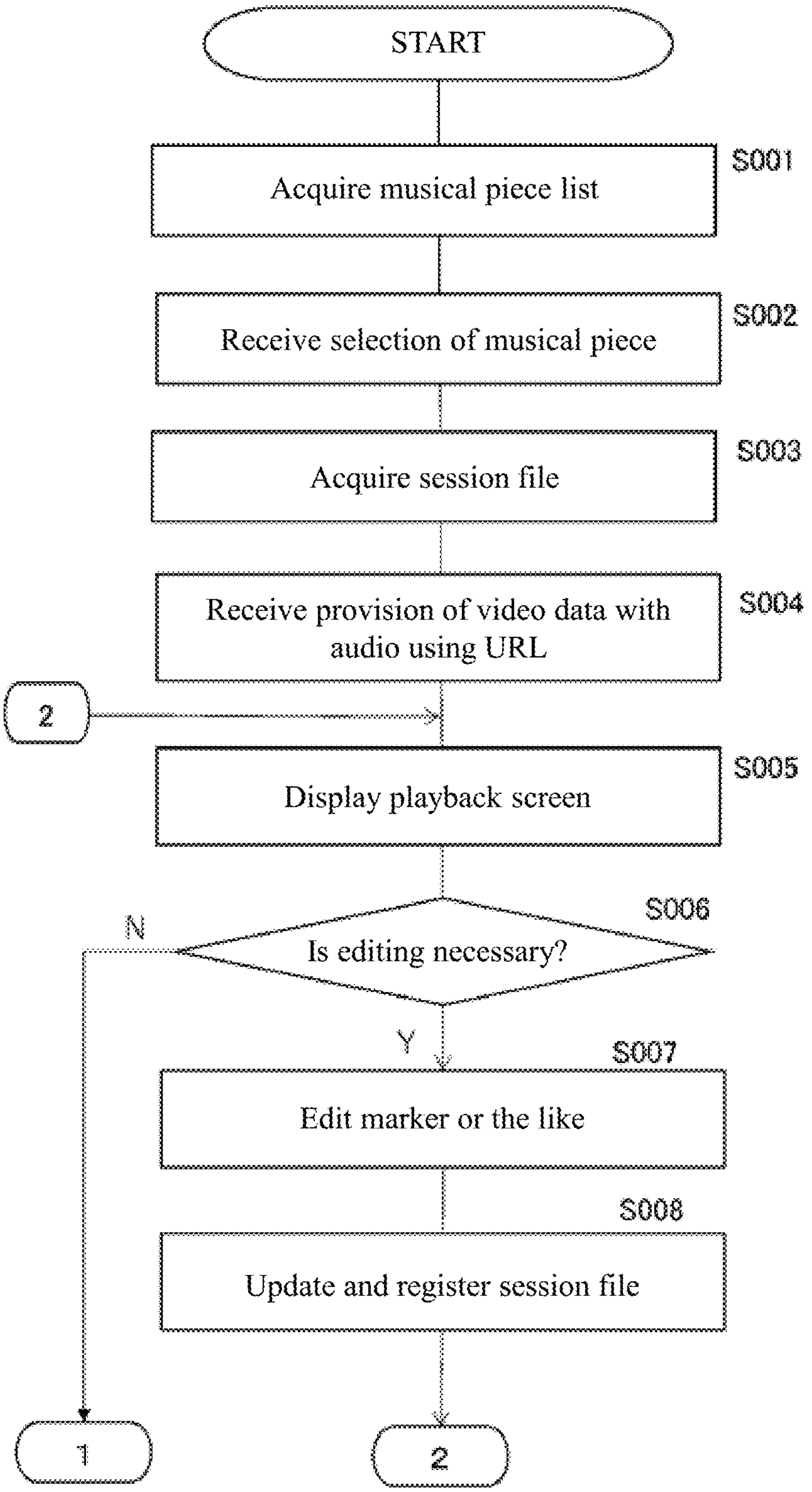
FIG. 6 is a flowchart showing an example of processing by a processor of an information processing device.
Figure 7:
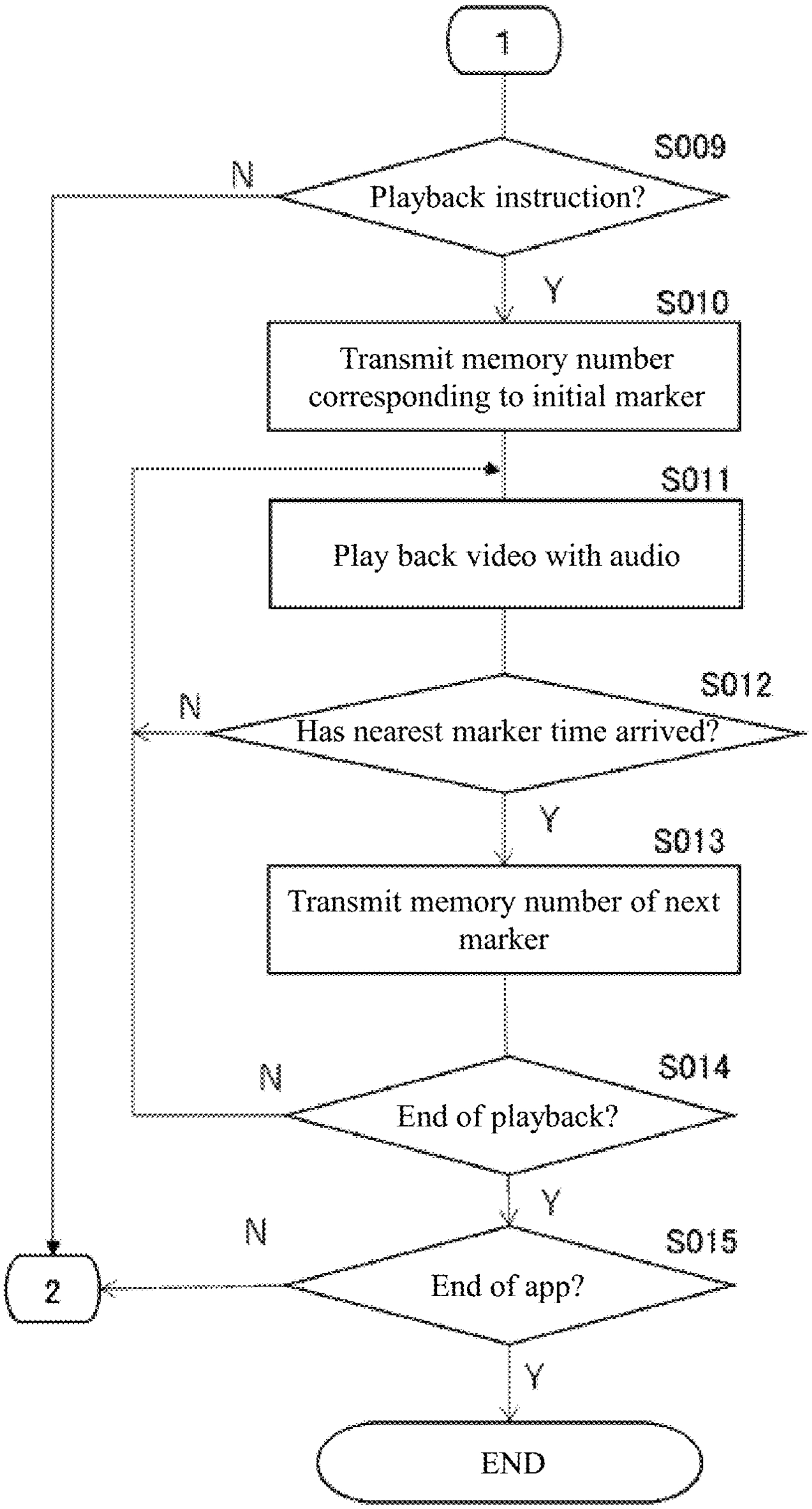
FIG. 7 is a flowchart showing an example of processing by a processor of an information processing device.

FIG. 6 and FIG. 7 are flowcharts showing an example of processing by the processor 21 of the information processing device 20, and describe an operation in the case where the processor 21 executes the above-mentioned practice app. When the practice app is started, the processor 21 accesses the first server 2 and acquires a musical piece list from the first server 2 (step S001). That is, the processor 21 generates, to the first server 2, a message requesting provision of the musical piece list. The communication IF 23 transmits the message, and receives from the first server 2 the musical piece list as a response to the message. The processor 21 obtains the musical piece list received by the communication IF 23.

In step S002, the processor 21 displays a screen of the musical piece list on the display 25, and receives an input of a result of selection of a musical piece made by the user 7 using the input device 24.

In step S003, the processor 21 acquires a session file of the selected musical piece from the first server 2. That is, the processor 21 generates a message requesting provision of a session file including the result of selection of the musical piece and a user ID being identification information of the user 7. The communication IF 23 transmits the message requesting provision to the first server 2. The first server 2 reads from a storage device the user ID and the session file corresponding to the musical piece included in the message, and transmits the same to the information processing device 20. The processor 21 acquires the session file via the communication IF 23. Regarding the session file received at this time, if the user 7 has not set a marker with respect to the musical piece, the session file includes the musical piece name and the URL, while the information (time, marker name, and memory number) pertaining to the marker is unedited.

In step S004, the processor 21 accesses the second server 3 using the URL in the session file, and receives provision of a video file with audio of the musical piece. At this time, a method for playing back the video file with audio may be streaming playback or download playback. If the storage device 22 has a video file with audio downloaded in the past, access to the second server 3 may be skipped.

In step S005, the processor 21 displays the playback screen 25A (FIG. 2) of the musical piece (that is, the video with audio) on a display. On the playback screen 25A, the video displayed in the display area 251 is an embedded video of a video sharing service (for example, YouTube™). Information on playback control (that is, the playback control such as playback, pause, rewind, and fast forward of the video) of the video is transmitted to video playback software supplied from the second server 3 using an application programming interface (API) of the video sharing service, and the playback control is performed by the video playback software. In the display area 251, an initial screen of the video with audio is displayed in a state of waiting for a playback instruction.

In step S006, the processor 21 determines whether editing (setting) of at least one of the marker and the memory number with respect to the musical piece is necessary. Whether editing is necessary is determined by, for example, whether the editing button 256 has been pushed down. Here, if it is determined that editing is necessary, the processing proceeds to step S007, otherwise the processing proceeds to step S009.

In step S007, the processor 21 displays the editing screen 25B for a marker on the display 25 to allow the user 7 to edit the marker. The user 7 is able to play back the video with audio using the UI 253 or the operator of the timbre control device 10, and is able to hear the musical piece from the headphone 5 connected to the timbre control device 10, determine a desired time to set a marker, and edit the marker. At this time, the memory number can be edited or an existing memory number can be selected according to needs. By the editing, one or more markers (time, marker name, and memory number) with respect to the musical piece are determined.

In step S008, the processor 21 updates the session file and includes the determined marker information in the session file. The processor 21 also performs processing for registering the updated session file. For example, the processor 21 generates a message requesting registration of the session file and transmits the message to the first server 2 via the communication IF 23. Based on the registration request, the first server 2 stores (registers) the session file in association with the user ID in a storage device managed by the first server 2. Accordingly, the session file is saved by the first server 2 (cloud). The session file may be stored (saved) in the storage device 22, or a USB memory or the like connected to the information processing device 20. When step S008 ends, the processing returns to step S005 and the playback screen 25A is displayed.

In step S009, the processor 21 determines whether a playback instruction has been input. Whether the playback instruction has been input is determined by, for example, whether the playback button in the UI 253 or the operator (playback button) of the timbre control device has been pushed down. If it is determined that the playback instruction has been input, the processing proceeds to step S010, otherwise the processing returns to step S005. In this way, a state is reached in which the editing button 256 or the playback button waits to be pressed while the playback screen 25A is being displayed.

In step S010, the processor 21 receives the playback instruction and transmits information on the memory number corresponding to the initial (first) marker to the timbre control device 10. The reason is that a time sometimes arrives simultaneously with the start of playback, like the first marker shown in FIG. 2. In the timbre control device 10, the information on the set of timbre parameters assigned the memory number is stored in the storage area corresponding to the memory number and used for audio processing applied from the time set in the marker.

After step S010 has ended, the processor 21, for example, waits for expiration of a predetermined timer, and waits for the timbre control device 10 to reach a state in which timbre processing (audio signal processing) using the set of timbre parameters of the memory number corresponding to the first marker can be performed. In step S011, the processor 21 supplies the playback instruction to the video playback software to cause the video with audio to be played back. Accordingly, the video is displayed in the display area 251 and the audio signal is transmitted to the timbre control device 10.

In step S012, the processor 21 determines whether a time of a nearest marker has arrived. If it is determined that the time has arrived, the processing proceeds to step S013, otherwise the processing returns to step S011.

In step S013, the processor 21 transmits information on the memory number corresponding to the next marker in the session file to the timbre control device 10. In the timbre control device 10, the information on the memory number corresponding to the next marker is stored in the storage area of the corresponding memory number, and a digital signal processor (DSP) is set so that the timbre immediately switches when the time set in the next marker arrives.

In step S014, the processor 21 determines whether playback of the video with audio has ended. If it is determined that the playback has ended, the processing proceeds to step S015, otherwise the processing returns to step S011. In step S015, it is determined whether to end the practice app. If it is determined to end the practice app, the processing of FIG. 6 and FIG. 7 is ended, otherwise the processing returns to step S005.

During the playback processing of step S011, if an operation of pausing, fast forwarding, or rewinding the video file with audio is performed by a user operation, these instructions are given to the video playback software and the processing for pause, fast forward, and rewind is performed.

In the present embodiment, an operation of rewinding for a predetermined time (10 seconds) can also be performed. Processing related to this will be described later. In the processing example of FIG. 7, the processing of step S010 is performed upon an input of the playback instruction. However, the processing of step S010 may be executed upon selection (confirmation of selection) of a musical piece.

<Timbre Control Device>

Figure 8:
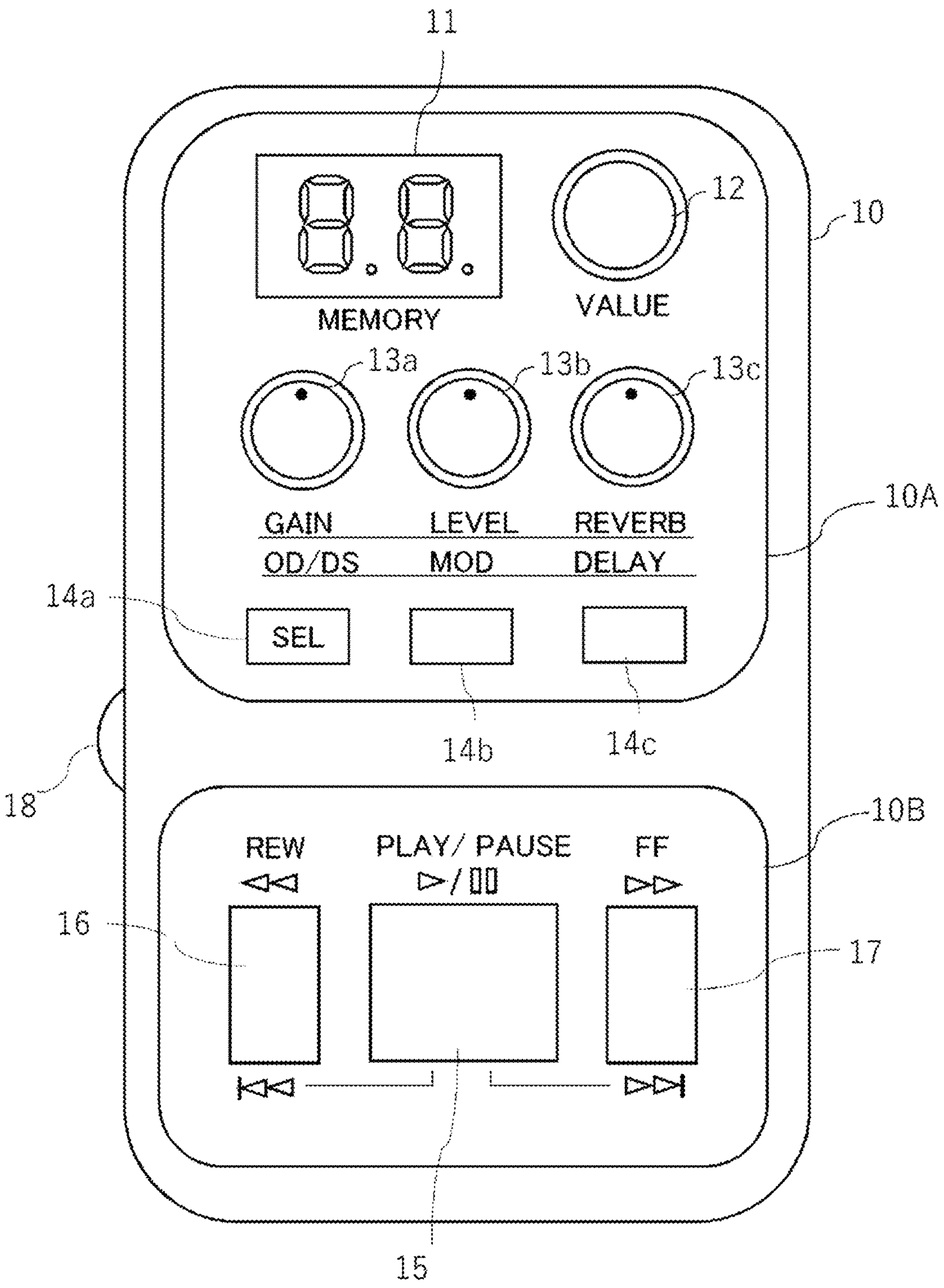
FIG. 8 shows an appearance configuration of a timbre control device.
Figure 9:
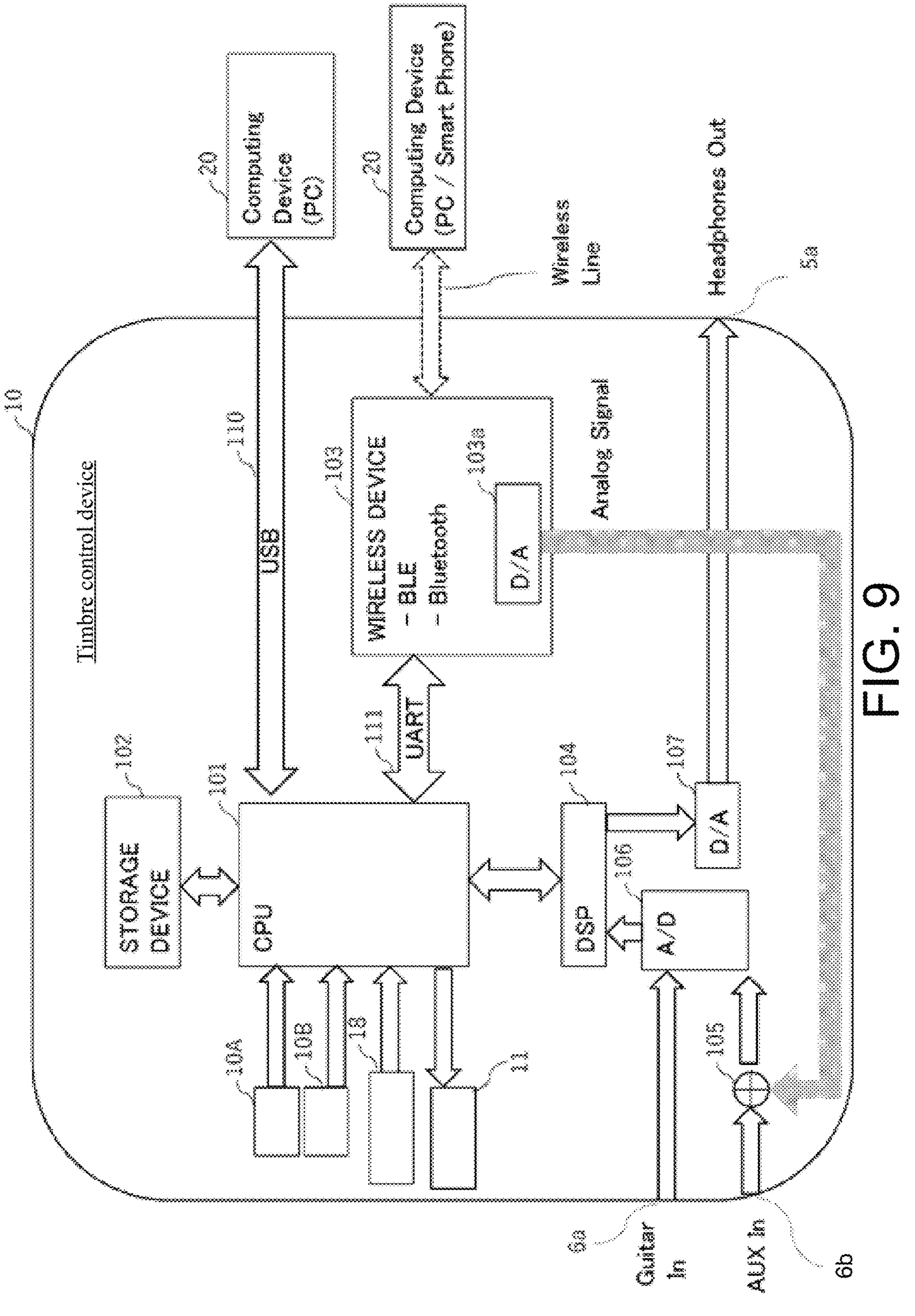
FIG. 9 shows a circuit configuration of a timbre control device.

FIG. 8 shows an appearance configuration of a timbre control device, and FIG. 9 shows a circuit configuration of a timbre control device. FIG. 8 shows a front surface of the timbre control device 10. On an upper side of the front surface, a first operator 10A and an indicator 11 used for setting information (memory number) pertaining to audio control are disposed. On a lower side of the front surface, a second operator 10B for operating playback control of a musical piece, that is, a video file with audio is disposed.

The first operator 10A used for setting a memory number includes knobs 12, 13*a*, 13*b*, 13*c* and buttons 14*a*, 14*b*, and 14*c*. The indicator 11 is a seven-segment indicator that displays a memory number. The knob 12 is a rotary knob used for changing display content of the indicator 11. The knobs 13*a*, 13*b*, and 13*c* are rotary knobs used for setting timbre (select), and are used for setting gain, level, and reverb values. However, the knobs 13*a*, 13*b*, and 13*c* are also able to switch to knobs for setting overdrive (OD)/distortion (DS), modulation (MOD), and delay values by push-down of the button 14*a* being a selection button. The button 14*b* is used for Bluetooth/BLE pairing with the information processing device 20.

The second operator 10B used for playback control includes a play back/pause button (PLAY/PAUSE) 15, a rewind (fast rewind) button (REW) 16, and a fast forward button (FF) 17. For example, when the rewind button 16 is quickly pressed twice, rewind for a certain time (10 seconds) is performed. When the rewind button 16 is pressed longer than a predetermined time, normal rewind is performed. A rotary knob 18 for volume is provided on a side surface of the timbre control device 10.

In FIG. 9, the timbre control device 10 includes a CPU 101, the storage device 102, a wireless device (wireless communication circuit) 103, a digital signal processor (DSP) 104, a digital-to-analog converter (D/A), and an analog-to-digital converter (A/D). The storage device 102 includes a ROM and a RAM, and has the same functions as the storage device 22.

The CPU 101 receives information pertaining to a timbre control input by operation (setting) of the first operator 10A, information pertaining to playback control input by operation of the second operator 10B, and a value from the rotary knob 18 for volume. The information is indicated by a state of a switch, a value of a variable resistor, a value of a rotary encoder, or the like. The CPU 101 displays a memory number on the indicator 11.

The wireless device 103 is connected to the CPU 101 via a universal asynchronous receiver-transmitter (UART). The wireless device 103 is a communication circuit that supports a predetermined wireless standard (Bluetooth and BLE), is connected to the wireless communication IF 27 of the information processing device 20 through a wireless line of Bluetooth and BLE, and is used for transmitting information indicating operation content of the first operator 10A and the second operator 10B and receiving an audio signal of a musical piece, memory number information and a memory number, or the like. Information exchanged using the information processing device 20 and the wireless device 103 may be transmitted and received using a USB 110.

The timbre control device 10 has a jack (terminal) 6*a* into which a cable plug from the electric guitar 6 is inserted, an AUX terminal 6*b*, and a terminal 5*a* for the headphone 5. An analog audio signal of the playing sound of the electric guitar 6 input from the terminal 6*a* is converted into a digital signal by an A/D 106 and input to the DSP 104. On the other hand, an audio signal (digital signal) of a musical piece received by the wireless device 103 through the wireless line is converted into an analog signal by a D/A 103*a* included in the wireless device 103. This analog signal is subjected to addition by an adder 105 provided between the AUX terminal 6*b* and the A/D 106, input to the A/D 106 to be converted into a digital signal, and input to the DSP 104.

The DSP 104 is a circuit that performs timbre control (audio signal processing) based on the set of timbre parameters of the memory number on at least one of an audio signal of the playing sound of the electric guitar 6 and an audio signal of the playback sound of the musical piece under the control of the CPU 101. The memory number information received by the wireless device 103 is given to the CPU 101 via a UART 111. The CPU 101 stores the information on the set of timbre parameters in the storage area provided in the storage device 102 and corresponding to the memory number. The information on the set of timbre parameters is used for forming a circuit for audio signal processing in the DSP 104, and is used for audio processing (timbre control) from a time when the memory number is applied. The DSP 104 synthesizes (mixes) the playing sound and the playback sound, and inputs a digital audio signal of the synthetic sound to a D/A 107. The D/A 107 converts the digital audio signal of the synthetic sound into an analog audio signal. The analog audio signal is connected to the headphone 5 via the terminal 5*a* for the headphone 5, and the synthetic sound is output from a speaker of the headphone 5.

Figure 10:
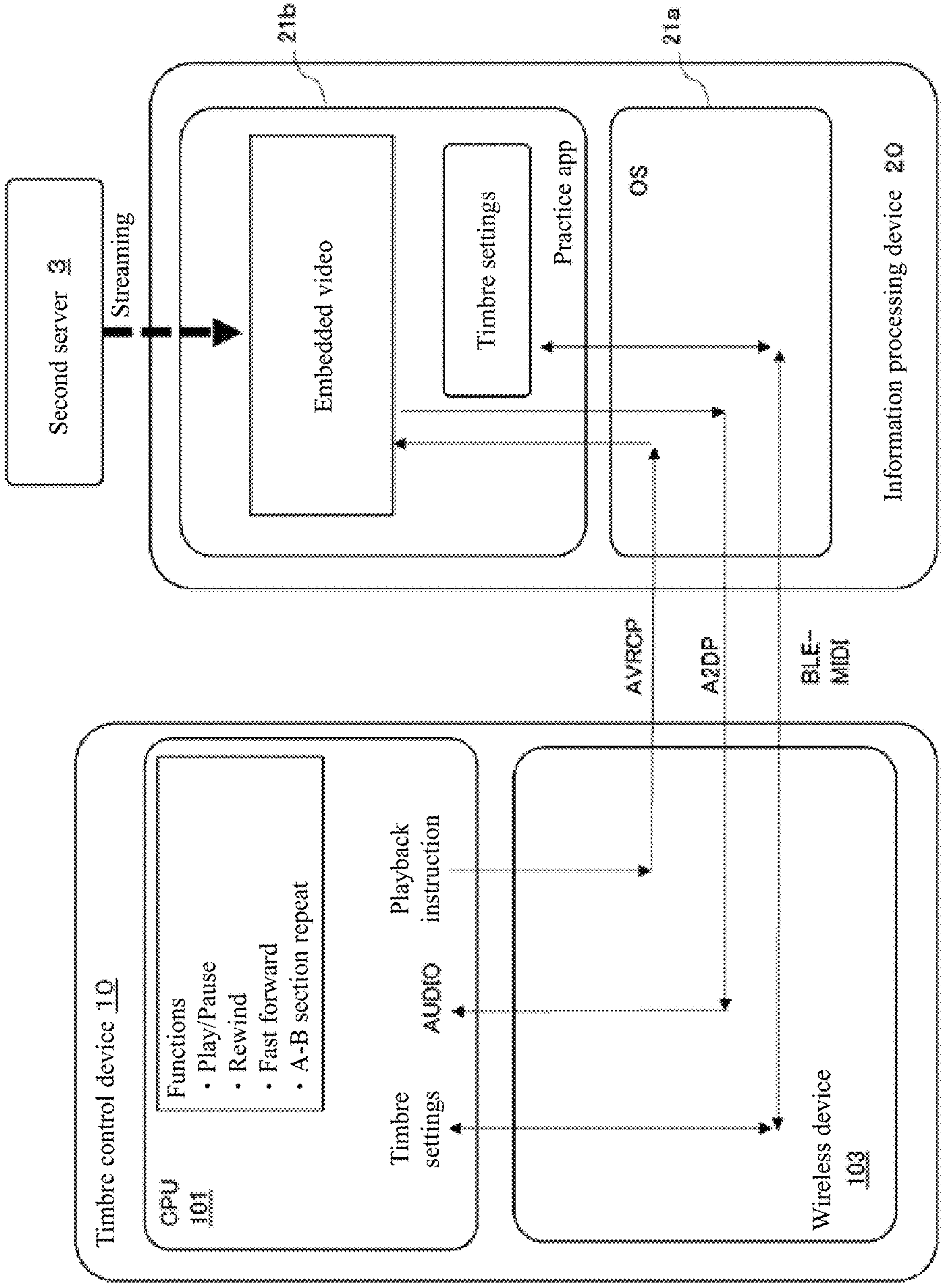
FIG. 10 describes an operation of an information processing device and a timbre control device.

FIG. 10 describes exchanges between the information processing device 20 and the timbre control device 10. By the processor 21 executing a program, the information processing device 20 operates as a device including an OS 21*a* and a practice app 21*b*. A video file with audio (streaming video with audio) provided from the second server 3 is provided as an embedded video on a screen of the practice app 21*b*.

Playback control of the video with audio is performed by operating the playback button 15, the rewind button 16 and the fast forward button 17 in the second operator 10B of the timbre control device 10. Information on the playback control by button operation, for example, a playback instruction issued by the CPU 101 by push-down of the playback button 15, is transmitted to the information processing device 20 via the wireless device 103.

The information pertaining to playback control is performed using an audio video remote control profile (AVRCP) supported by Bluetooth (Bluetooth 4.2). The AVRCP is a profile for realizing a remote control function of an AV apparatus. The information pertaining to playback control is given to the video playback software (second server) via the practice app 21*b*, and the second server 3 controls playback of a video.

A digital audio signal of a musical piece based on a video with audio is supplied to the timbre control device 10 using an advanced audio distribution profile (A2DP) supported by Bluetooth (Bluetooth 2.1 and 3.0). The A2DP is a profile for transmitting the audio to a headphone equipped with a receiver. In contrast, information pertaining to timbre control settings is transmitted and received using a MIDI over Bluetooth low energy (BLE-MIDI) technology supported by Bluetooth 4.0 (BLE).

Here, a rewind operation for a certain time (for example, 10 seconds, and may be longer or shorter than 10 seconds) is described with reference to FIG. 11. It is assumed that the rewind operation for a certain time is performed using the rewind button 16 in the information processing device 20 while the video with audio is being played back (<1> of FIG. 11). Then, a rewind instruction is given to the video playback software via the practice app 21*b*, and the video with audio is rewound. At this time, the video playback software outputs a current time of the rewound video with audio, and the OS 21*a* converts the current time into a song position pointer (SPP) and transmits the SPP to the timbre control device 10 (<2> of FIG. 11). The SPP is given to the CPU 101 via the wireless device 103.

Figure 11:
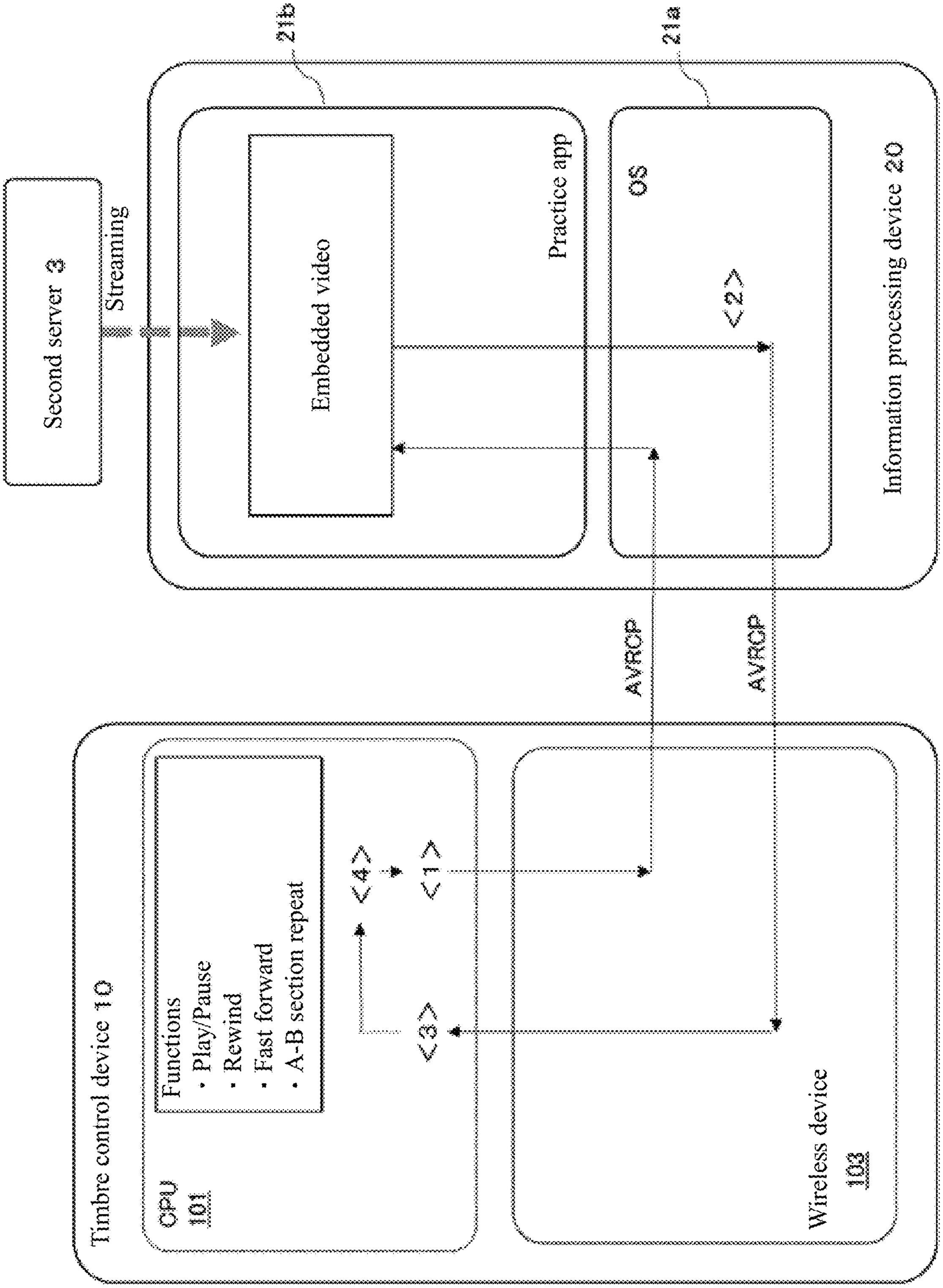
FIG. 11 describes an operation of an information processing device and a timbre control device.

When the CPU 101 acquires the SPP (<3> of FIG. 11), the CPU 101 determines whether a value of the SPP traces back to an expected time (time 10 seconds before) (<4> of FIG. 11). At this time, if it is determined that the value traces back to the expected time, the CPU 101 ends the processing, otherwise the CPU 101 transmits the rewind instruction again (<1> of FIG. 11).

Figure 12:
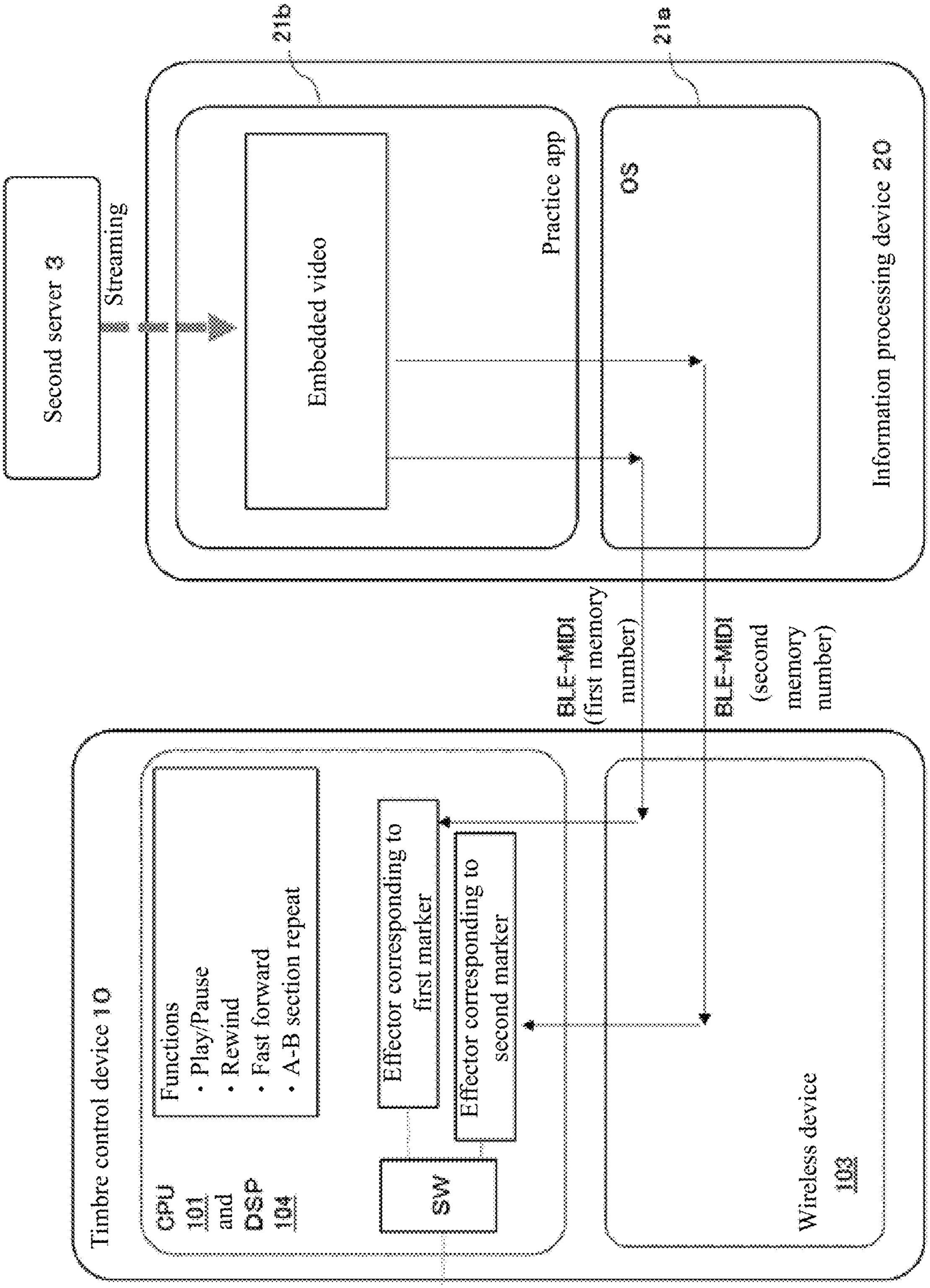
FIG. 12 describes an operation of an information processing device and a timbre control device.

FIG. 12 describes switching processing for two or more memory numbers. A case is assumed in which the first to third markers are set with respect to a musical piece as described above. In this case, prior to arrival of a time of the first marker, the practice app 21*b* (processor 21) sends the memory number "01" (first memory number) corresponding to the first marker to the timbre control device 10 upon, for example, selection of the musical piece. In the timbre control device 10, by setting the information on the set of timbre parameters of the first marker stored in a storage area of the memory number "01" in the DSP 104, the CPU 101 generates an effector circuit corresponding to the first marker in the DSP 104. An audio signal of the playing sound of the electric guitar 6 is input to the effector circuit corresponding to the first marker from a first time, an effect is imparted (timbre control is performed), and an audio signal after effect impartment is output.

After that, when the time of the first marker arrives, the practice app 21*b* (processor 21) sends the memory number "02" (second memory number) corresponding to the second marker to the timbre control device 10 upon arrival of the time of the first marker. In the timbre control device 10, by setting the information on the set of timbre parameters of the second marker stored in a storage area of the memory number "02" in the DSP 104, the CPU 101 generates an effector circuit corresponding to the second marker in the DSP 104. At this time, the audio signal of the electric guitar 6 is input to both effector circuits. A switch (SW) outputs a signal from the effector corresponding to the first marker until a time of the second marker arrives, and switches its output to a signal from the effector corresponding to the second marker when the time of the second marker arrives. Accordingly, the timbre control by the first marker can be seamlessly switched to the timbre control by the second marker.

If the time of the second marker has arrived, information on a memory number corresponding to the third marker is transmitted to the timbre control device 10 from the information processing device 20, an effector corresponding to the third marker is generated in the DSP 104, and the effector corresponding to the third marker is applied from a time of the third marker.

Effects of Embodiment

In the information processing system according to an embodiment, the processor 21 (control part) of the information processing device 20 receives an input of information indicating one or more times in a playback time of a musical piece, and generates a session file including information pertaining to a timbre control performed from each of the one or more times. The wireless communication IF 27 (transmission part) of the information processing device 20 transmits an audio signal of the musical piece and the information pertaining to the timbre control in the file to the timbre control device 10 (device) that outputs a synthetic sound of a playback sound of the musical piece and a playing sound of a musical instrument. Accordingly, a timbre control by a memory number desired by the user 7 can be performed on at least one of the playing sound of the electric guitar 6 (musical instrument) and the playback sound of the musical piece (in the embodiment, the playing sound of the electric guitar 6) at a time desired by the user 7.

According to the information processing device 20 of the embodiment, the processor 21 (control part) is able to display, on the display 25 (display device), a screen (playback screen 25A, editing screen 25B) for setting information pertaining to time and timbre control on which information indicating the playback time of the musical piece is displayed. Accordingly, the user 7 can be provided with a marker setting environment.

According to the information processing device 20 of the embodiment, based on the URL (information indicating the save location of the musical piece data) of the musical piece, the processor 21 (control part) is able to acquire the musical piece data from the second server 3 (distribution device that distributes the musical piece data) connected to the information processing device 20 via the network 1. The embodiment adopts a configuration in which the musical piece is uniquely determined by the URL. Accordingly, management of the musical piece becomes easy. In the embodiment, the musical piece data is audio data in the video file with audio. However, the musical piece data may be an audio file.

According to the information processing device 20 of the embodiment, the processor 21 (control part) acquires the URL from the first server 2 (file management device) connected to the information processing device 20 via the network 1. The processor 21 requests the first server 2 to save the session file including the information indicating time, the information pertaining to a timbre control, and the URL. In this way, the first server 2 is able to manage the musical piece and the session file.

The processor 21 may store the session file including the information indicating time, the information pertaining to a timbre control, and the URL in the storage device 22 included in the information processing device 20. The storage device may be a storage device such as a USB memory attached to the information processing device 20.

In the information processing device 20, in the case where the time includes the first time (00:00) and the second time (00:10), prior to arrival of the first time, the wireless communication IF 27 (transmission part) transmits the information pertaining to a timbre control corresponding to the first time to the timbre control device 10 upon selection of the musical piece, and transmits the information pertaining to a timbre control corresponding to the second time upon arrival of the first time during playback of the musical piece. Accordingly, seamless switching of timbre control becomes possible.

In the information processing device 20, the processor 21 displays the timbre control content editing screen on the display 25, and receives information indicating the timbre control content (information pertaining to timbre control settings) transmitted to the information processing device 20 from the timbre control device 10. Accordingly, a memory number can be set through an operation of the timbre control device 10.

The information processing device 20 is able to communicate with the timbre control device 10 using Bluetooth (Bluetooth 2.1 or 3.0) and BLE (Bluetooth 4.0). The processor 21 receives control information (playback control information) pertaining to playback of the musical piece using the AVRCP from the timbre control device 10, and receives information for editing a timbre using BLE-MIDI from the timbre control device 10. Accordingly, the information about timbre control settings can be transmitted using BLE.

The processing performed by the processor 21 or the CPU 101 may be performed by a plurality of CPUs (processors) or by a CPU having a multi-core configuration. The processing performed by the processor 21 may be executed by a processor (such as a DSP or a GPU) other than a CPU, an integrated circuit (such as an ASIC or an FPGA) other than a processor, or a combination (such as an MPU or an SoC) of a processor and an integrated circuit.

<Modifications>

Figure 13:
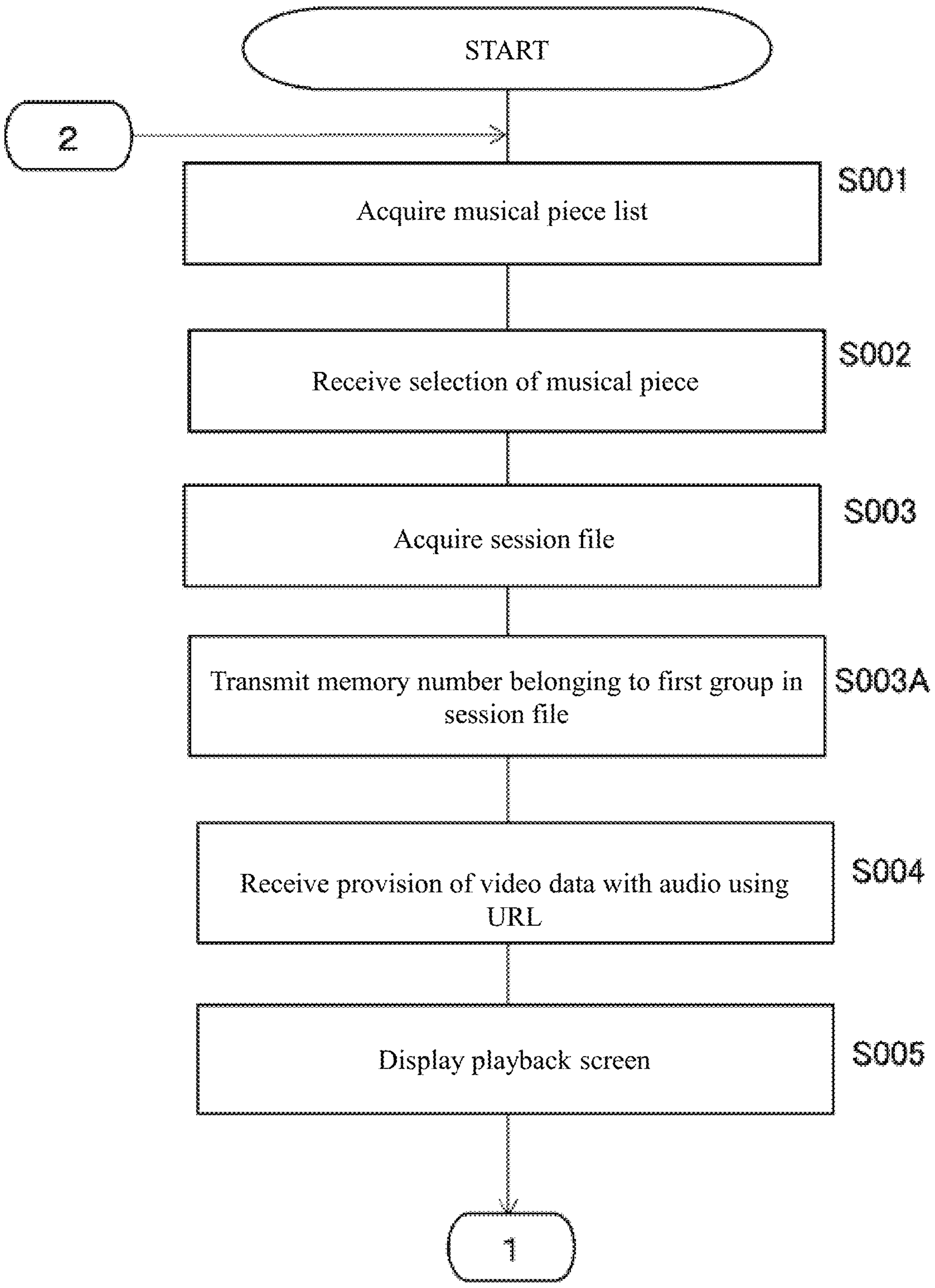
FIG. 13 is a flowchart showing an example of processing by a processor of an information processing device in a modification.
Figure 14:
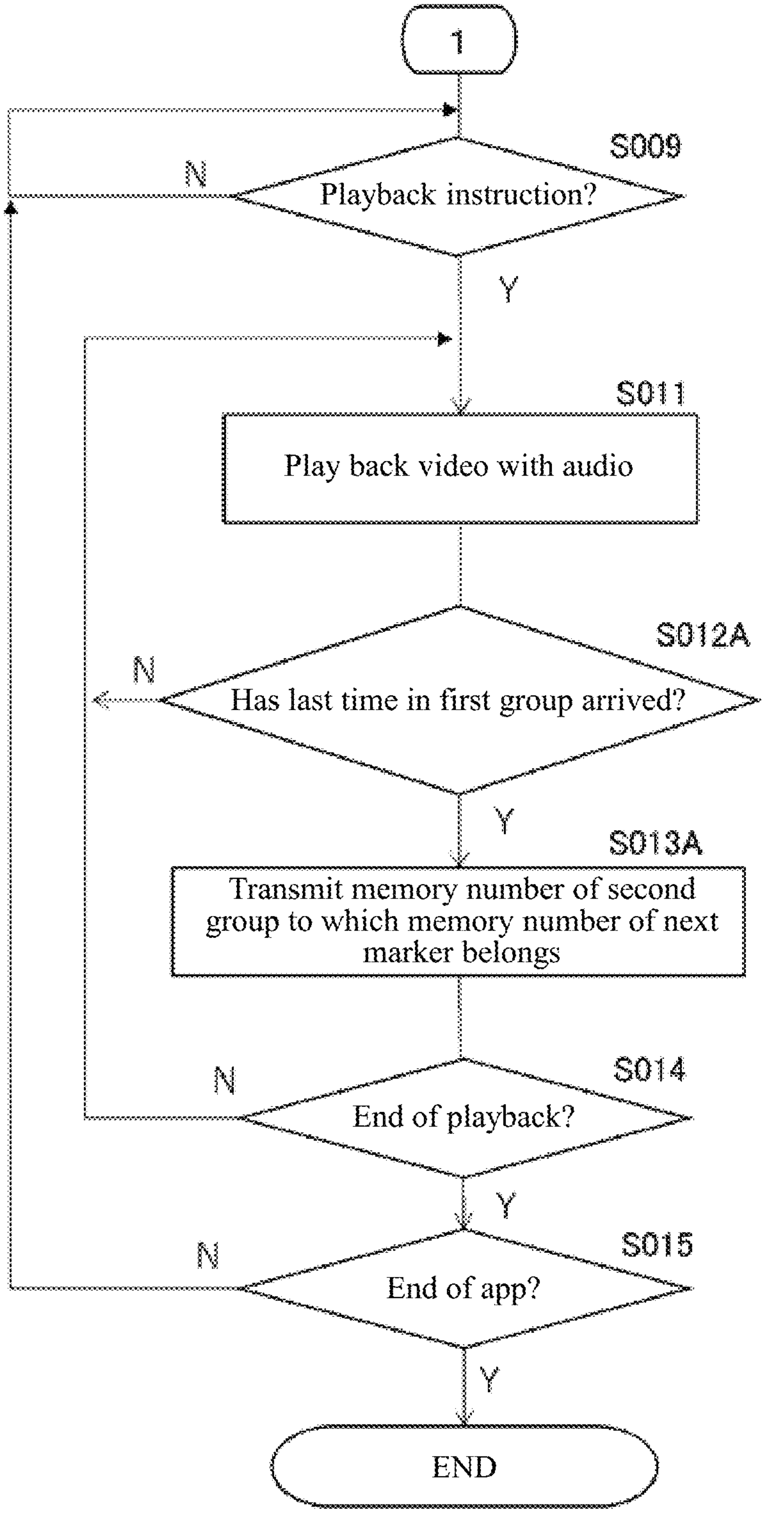
FIG. 14 is a flowchart showing an example of processing by a processor of an information processing device in a modification.
Figure 15:
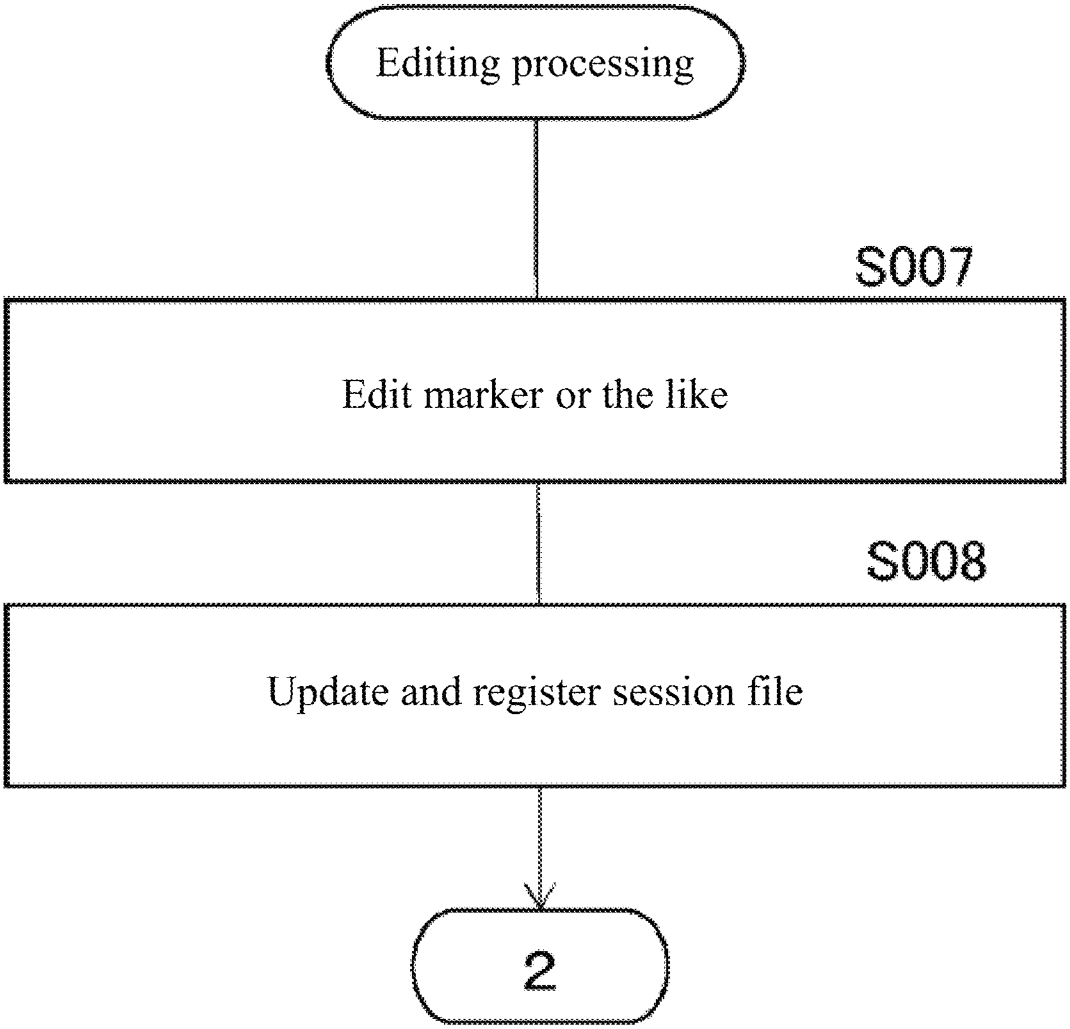
FIG. 15 is a flowchart showing an example of processing by a processor of an information processing device in a modification.

FIG. 13 to FIG. 15 are flowcharts showing examples of processing by the information processing device 20 in a modification. As a prerequisite for the processing shown in FIG. 13, it is assumed that a session file stores a plurality of edited markers (a plurality of times and a memory number corresponding to each of the plurality of times).

As an example, as shown in FIG. 4, the session file includes markers (1), (2) and (3), and a plurality of times (that is, a time “00:00:00” (first time), a time “00:10:00” (second time), and a time “00:33:00” (third time)) respectively corresponding to the markers (1), (2) and (3). The storage device 22 stores setting information to the effect that, among the first to third times, the first time and the second time corresponding to a time that arrives first and a time that arrives second belong to a first group. The storage device 22 also stores setting information to the effect that the third time being the next time after the second time belongs to a second group.

In the processing shown in FIG. 13, the processing of steps S001 to S005 is the same as the processing (FIG. 6) in the embodiment. However, the modification differs from the embodiment in that step S003A is provided between step S003 and step S004. The processing of steps S009, S011, S014 and S015 in FIG. 14 is the same as the processing shown in FIG. 7. However, the modification shown in FIG. 14 differs from the embodiment in that there is no step S010, and steps S012A and S013A are provided in place of steps S012 and S013.

As shown in FIG. 15, the editing processing of the session file in the modification is interrupt processing executed upon occurrence of an editing event such as push-down of the editing button 256. The same processing as that of steps S007 and S008 shown in FIG. 6 is executed, and when the processing ends, the processing returns to step S001 (FIG. 13).

In step S003A, a memory number (information pertaining to a timbre control) corresponding to, among the plurality of times in the session file acquired in step S003, each of a predetermined number of times belonging to the first group, that is, each of the first time and the second time, is transmitted to the timbre control device 10. In the timbre control device 10, the CPU 101 controls a circuit based on the set of timbre parameters stored in the storage area corresponding to the memory number “01” of the marker (1) and a circuit based on the set of timbre parameters stored in the storage area corresponding to the memory number “02” of the marker (2) to be built in parallel in the DSP 104. The processing of step S003A may be executed after step S004 or step S005, or may be performed in parallel with step S004.

After that, in step S009, when it is determined that the playback instruction has been input, the processor 21 performs playback of the video with audio. In a playback time of the video with audio, when a current time reaches the second time being the last time in the first group (Yes in step S012A), the processor 21 transmits a memory number of the second group to which the memory number “08” of the next marker (3) belongs to the timbre control device 10 (step S013A). In the modification, since the only memory number belonging to the second group is the memory number “08”, one memory number “08” is transmitted.

However, the number of markers (that is, number of times) belonging to each of the first group and the second group can be set to an appropriate number such as 1 or 2 or greater. Thus, if the session file includes, for example, two markers (the first time and the second time), the memory number corresponding to the first time is transmitted (step S003A) upon selection of the musical piece, and the memory number corresponding to the second time is transmitted (step S013A) upon arrival of the first time (Yes in step S012A).

According to the modification described above, in the case where a memory number (information pertaining to a timbre control) is set for each of a plurality of times in a playback time of a musical piece, the wireless communication IF 27 (transmission part) transmits the memory number corresponding to a predetermined number of times (for example, the first and second times) selected from the plurality of times in order of arrival upon selection of the musical piece. During playback of the musical piece, upon arrival of the last time (second time) among the predetermined number of times, the wireless communication IF 27 is able to transmit the information pertaining to a timbre control corresponding to a time (third time) among the plurality of times that arrives after the last time.

What is claimed is:

1. An information processing device, comprising:

a control part, receiving an input of information indicating a plurality of timepoints in a playback time of a musical piece, and generating a file comprising information pertaining to a timbre control to be performed from each of the plurality of timepoints in the playback time of the musical piece;

a display part, displaying the information pertaining to the timbre control to be performed from the plurality of timepoints in the playback time of the musical piece and a marker indicating each of the plurality of timepoints in the playback time of the musical piece on a single time bar; and a transmission part, transmitting an audio signal of the musical piece and the information pertaining to the timbre control in the file to a device that performs the timbre control on a playback sound of a musical instrument according to the plurality of timepoints and outputs a synthetic sound of a playback sound of the musical piece and the playing sound of the musical instrument with the timbre control being performed.

2. The information processing device according to claim 1, wherein the display part displays a screen for setting the plurality of timepoints and the information pertaining to the timbre control, on which information indicating the playback time of the musical piece is displayed, wherein the plurality of timepoints comprise a first designated timepoint and a second designated timepoint different from the first timepoint, wherein the information pertaining to the timbre control comprises first information and second information different from the first information, wherein the first information corresponds to a first set of timbre parameters applied to the timbre control from the first designated timepoint, and wherein the second information corresponds to a second set of timbre parameters, different from the first set of timbre parameters, applied to the timbre control from the second designated timepoint.

3. The information processing device according to claim 1, wherein based on information indicating a save location of data of the musical piece, the control part acquires the data of the musical piece from a distribution device that is connected to the information processing device via a network and distributes the data of the musical piece.

4. The information processing device according to claim 1, wherein the musical piece is uniquely determined by information indicating a save location of data of the musical piece.

5. The information processing device according to claim 1, wherein data of the musical piece is audio data in a video file with audio.

6. The information processing device according to claim 3, wherein the control part acquires the information indicating the save location of the data of the musical piece from a file management device connected to the information processing device via a network.

7. The information processing device according to claim 6, wherein the control part requests the file management device to save the file comprising the information indicating the plurality of timepoints, the information pertaining to the timbre control, and the information indicating the save location of the musical piece.

8. The information processing device according to claim 3, wherein the control part stores the file comprising the information indicating the plurality of timepoints, the information pertaining to the timbre control, and the information indicating the save location of the musical piece in at least one of a storage device comprised in the information processing device and a storage device attached to the info illation processing device.

9. The information processing device according to claim 1, wherein in a case where the information pertaining to the timbre control is set for each of the plurality of timepoints in the playback time of the musical piece, upon selection of the musical piece, the transmission part transmits information pertaining to a timbre control corresponding to a predetermined number of timepoints selected from the plurality of timepoints in order of arrival, and, upon arrival of a last timepoint among the predetermined number of timepoints during playback of the musical piece, the transmission part transmits information pertaining to a timbre control corresponding to a timepoint among the plurality of timepoints that arrives after the last timepoint.

10. The information processing device according to claim 9, wherein in a case where the plurality of timepoints comprise a first timepoint and a second timepoint, upon selection of the musical piece, information pertaining to a timbre control corresponding to the first timepoint is transmitted to the device, and, upon arrival of the first timepoint during playback of the musical piece, information pertaining to a timbre control corresponding to the second timepoint is transmitted to the device.

11. The information processing device according to claim 9, wherein in a case where the plurality of timepoints comprise a first timepoint, a second timepoint and a third timepoint, upon selection of the musical piece, information pertaining to a timbre control corresponding to the first timepoint and the second timepoint is transmitted to the device, and, upon arrival of the second timepoint during playback of the musical piece, information pertaining to a timbre control corresponding to the third timepoint is transmitted to the device.

12. The information processing device according to claim 1, wherein the control part displays a timbre control content editing screen on a display device, and receives information indicating content of the timbre control transmitted to the information processing device from the device.

13. The information processing device according to claim 10, wherein the information processing device is able to communicate with the device using Bluetooth and BLE; and the control part receives control information pertaining to playback of the musical piece using an AVRCP from the device, and receives information for timbre editing using BLE-MIDI from the device.

14. An information processing method, comprising, by an information processing device:

receiving an input of information indicating a plurality of timepoints in a playback time of a musical piece;

generating a file comprising information pertaining to a timbre control to be performed from each of the plurality of timepoints in the playback time of the musical piece;

displaying the information pertaining to the timbre control to be performed from the plurality of timepoints in the playback time of the musical piece and a marker indicating each of the plurality of timepoints in the playback time of the musical piece on a single time bar; and transmitting an audio signal of the musical piece and the information pertaining to the timbre control in the file to a device that performs the timbre control on a playback sound of a musical instrument according to the plurality of timepoints and outputs a synthetic sound of a playback sound of the musical piece and the playing sound of the musical instrument with the timbre control being performed.

15. A non-transitory computer readable recording medium storing a program, the program causing a computer of an information processing device to:

receive an input of information indicating a plurality of timepoints in a playback time of a musical piece;

generate a file comprising information pertaining to a timbre control to be performed from each of the plurality of timepoints in the playback time of the musical piece;

displaying the information pertaining to the timbre control to be performed from the plurality of timepoints in the playback time of the musical piece and a marker indicating each of the plurality of timepoints in the playback time of the musical piece on a single time bar; and transmit an audio signal of the musical piece and the information pertaining to the timbre control in the file to a device that performs the timbre control on a playback sound of a musical instrument according to the plurality of timepoints and outputs a synthetic sound of a playback sound of the musical piece and the playing sound of the musical instrument.

16. The information processing method according to claim 14, further comprising:

in a case where the information pertaining to the timbre control is set for each of the plurality of timepoints in the playback time of the musical piece, upon selection of the musical piece, transmitting information pertaining to a timbre control corresponding to a predetermined number of timepoints selected from the plurality of timepoints in order of arrival, and, upon arrival of a last timepoint among the predetermined number of timepoints during playback of the musical piece, transmitting information pertaining to a timbre control corresponding to a timepoint among the plurality of timepoints that arrives after the last timepoint.

17. The information processing method according to claim 16, further comprising:

in a case where the plurality of timepoints comprise a first timepoint and a second timepoint, upon selection of the musical piece, transmitting information pertaining to a timbre control corresponding to the first timepoint to the device, and, upon arrival of the first timepoint during playback of the musical piece, transmitting information pertaining to a timbre control corresponding to the second timepoint to the device.

18. The information processing method according to claim 16, further comprising:

in a case where the plurality of timepoints comprise a first timepoint, a second timepoint and a third timepoint, upon selection of the musical piece, transmitting information pertaining to a timbre control corresponding to the first timepoint and the second timepoint to the device, and, upon arrival of the second timepoint during playback of the musical piece, transmitting information pertaining to a timbre control corresponding to the third timepoint to the device.

19. The non-transitory computer readable recording medium storing the program according to claim 15, wherein the program further causes the computer of the information processing device to:

in a case where the information pertaining to the timbre control is set for each of the plurality of timepoints in the playback time of the musical piece, upon selection of the musical piece, transmit information pertaining to a timbre control corresponding to a predetermined number of timepoints selected from the plurality of timepoints in order of arrival, and, upon arrival of a last timepoint among the predetermined number of timepoints during playback of the musical piece, transmit information pertaining to a timbre control corresponding to a timepoint among the plurality of timepoints that arrives after the last timepoint.

20. The non-transitory computer readable recording medium storing the program according to claim 19, wherein the program further causes the computer of the information processing device to:

in a case where the plurality of timepoints comprise a first timepoint and a second timepoint, upon selection of the musical piece, transmit information pertaining to a timbre control corresponding to the first timepoint to the device, and, upon arrival of the first timepoint during playback of the musical piece, transmit information pertaining to a timbre control corresponding to the second timepoint to the device.

* * * * *